United States Patent [19]

Matthews et al.

[11] Patent Number: 4,799,154

[45] Date of Patent: Jan. 17, 1989

[54] ARRAY PROCESSOR APPARATUS

[75] Inventors: Kim N. Matthews, Romford; Terence J. Fountain, Beckenham, both of England

[73] Assignee: National Research Development Corporation, London, England

[21] Appl. No.: 798,800

[22] Filed: Nov. 15, 1985

[30] Foreign Application Priority Data

Nov. 23, 1984 [GB] United Kingdom ............... 8429599

[51] Int. Cl.⁴ .............................................. G06F 9/06
[52] U.S. Cl. .................................................. 364/200
[58] Field of Search ... 364/200 MS File, 900 MS File; 382/49

[56] References Cited

U.S. PATENT DOCUMENTS

| | | | |
|---|---|---|---|
| 4,365,292 | 12/1982 | Barnes et al. | 364/200 |
| 4,435,758 | 3/1984 | Lorie et al. | 364/200 |
| 4,466,064 | 8/1984 | Martin | 364/200 |
| 4,574,384 | 3/1986 | Scallon | 364/200 |

FOREIGN PATENT DOCUMENTS

| | | |
|---|---|---|
| 1130233 | 10/1968 | United Kingdom . |
| 1135554 | 12/1968 | United Kingdom . |
| 1241403 | 8/1971 | United Kingdom . |
| 1530173 | 10/1978 | United Kingdom . |
| 1540960 | 2/1979 | United Kingdom . |
| 1551450 | 8/1979 | United Kingdom . |

Primary Examiner—Thomas M. Heckler
Assistant Examiner—Jonathan C. Fairbanks
Attorney, Agent, or Firm—Cushman, Darby & Cushman

[57] ABSTRACT

In processor arrays for image processors it is useful to be able to determine which is the "top left" array element having a value above or below a threshold. In the present invention an array of processors includes a number of priority encoder circuits connected to the processors to give the address of the top left array element which has a predetermined significance. Decoder circuits are provided to allow particular processors to be addressed, and methods of counting the number of array elements having a predetermined significance, and of reading data to and from the processors, are also described.

10 Claims, 3 Drawing Sheets

ARRAY PROCESSOR APPARATUS

The present invention relates to an array of processors for handling a corresponding array of items of data such as pixels in an image or pattern. The invention also relates to methods of controlling such a processor array.

Processors for use in arrays of this type usually contain an arithmetic and logic unit and associated registers for carrying out arithmetic and Boolean functions on data held by the processor itself and on data held by neighboring processors in the array. The processors are usually microprocessors either in individual integrated circuits or in groups of several forming a single such circuit. An image processing system for binary data, the CLIP 4 system, is described in a paper "Review of the CLIP imaging system" by M. J. B. Duff, National Computer Conference, 1978, where the array comprises 96 by 96 CLIP 4 cells. Each cell has a processor which is controlled to carry out various functions by control signals applied to external terminals. Further information on CLIP systems and the ways in which they can be operated will be found in a paper "The development of the CLIP 7 image processing system" by T. J. Fountain, Pattern Recognition Letters 1 (1983) 331–339, July 1983. The references of these papers give examples of arrays of processor cells and of the ways in which they can be operated. An example of an array processor is described in British Specification No. 2129589 and corresponding U.S. patent application No. 439982, filed Nov. 8, 1982, (now abandoned) by inventors Fountain and Duff.

According to a first aspect of the present invention there is provided apparatus for processing an array of items of data comprising an array of processors, one processor for, and corresponding to, every data item in an array, each processor having an output terminal connected to an input terminal of at least one other processor in the array, means for applying data to the processors and reading data therefrom, and priority encoder means having respective input terminals coupled to the output terminals or further output terminals of respective said processors, the encoder means being arranged to provide an output signal representing the position in the array of any processor having an output signal at an output terminal thereof coupled to the encoder means which signifies that the corresponding data item has a particular significance unless there is a plurality of such processors when the said output signal is representative of the position of that one of the said plurality of processors which has the highest priority according to a predetermined priority dependent on position in the array.

An array of items of data which is larger than the data array of the first aspect of the invention may be processed by using the apparatus of the said first aspect to scan the larger array.

Where data items represent an image by binary values in a raster scan display, the predetermined priority may, for example, select the top leftmost pixel (data item) which has the said particular significance and causes its processor output to be set (that is to indicate a logical 1). The particular significance may for example be that a pixel is black. Many other priorities such as, in this context, the most central pixel or the set pixel nearest a specified position may be defined by the encoder means; but for other forms of data processing alternative priority functions prove useful.

Apparatus according to the invention preferably also includes decoder means having address terminals, and enable terminals connected to respective processors whereby through application of an address signal to the address terminals one particular processor in the array corresponding to that address is selected to carry out a required function.

The encoder means may comprise a plurality of groups of priority encoder circuits, each encoder circuit having a plurality of input terminals, a plurality of output address terminals, and an enable output terminal, inputs applied to the input terminals being uniquely mapped to signals on the address output terminals. The input terminals of a first group of priority encoder-circuits are connected to the output terminals of the processors and these connections may be considered as part of the encoder means and take a part in defining the said predetermined priority. The output address terminals in each group of encoder circuits are connected in parallel while the enable terminals of each group except a last group are connected to the input terminals of another group. As a result and with the help of additional connections mentioned below, when all the output address terminals of the various groups are assembled, the assembly provides the address of that processor which has a "set" output and has the highest priority. Progressing through the groups of encoder circuits away from the processor array, each group contains less such circuits until the final group contains only one circuit and its enable terminal, known as the overall gating terminal, provides an indication of whether any data item in the array has the said particular significance.

In an analogous way the decoder means may comprise a plurality of decoder circuits connected in groups. Each decoder circuit then has a group of input address terminals and a number of enable output terminals. The input address terminals of the circuits in each group are connected in parallel and each group is given a significance in the overall addresses of the processors. The enable output terminals of each group are connected to the input terminals of decoders in the next lower significance group until the enable output terminals of the lowest significant group are connected to input terminals of the processors.

Preferably each processor contains an input shift register serially coupled to an output enable terminal of the decoder means and/or an output shift register serially coupled to one of the input terminals of the encoder means.

Advantageously means are also provided for addressing all processors at the same time, and where groups of decoder circuits are employed, may be provided by a connection to an additional terminal of each circuit in the group of lowest significance where the application of a signal to the additional terminal causes a decoder circuit to provide a signal at all its enable output terminals.

According to a second aspect of the present invention there is provided a method of counting the number of data items which have the said particular significance, using apparatus according to the first aspect of the invention, comprising the steps of obtaining from the encoder means the address of that processor which has the highest priority and which is set, that is has an output signifying that the corresponding data item has the said particular significance, using the address obtained in causing the addressed processor to reset its output, initiating a data item count, determining the address of the set processor which now has the highest priority, increasing the data count by one, and repeating the two preceding steps until there are no further set processors, when the count represents the number of data items in the array which originally had the said particular significance.

In order to reset the output of the highest priority set processor from a first value to zero as required in the method of the second aspect of the invention, the following procedure may be used: enter a new data array into the processor array with all values equal to zero except at the highest priority processor (as indicated by the output signal of the encoder means) where the new data array has the first value, and cause the processors to subtract items of the new data array from corresponding items of the data array formed by the processor output signals. All set processors then retain their outputs except that of highest priority which is set to zero.

According to a third aspect of the present invention there is provided a method of reading data into a processor forming part of apparatus according to the first aspect of the invention, the apparatus including the said decoder means, wherein each processor has an input shift register connected to an enable terminal of the decoder means, comprising the steps of applying an address to the decoder means to select an enable terminal, shifting the input shift register of the processor connected to the selected enable terminal through its stages while applying, in synchronism, a binary signal representing data to be read in to an enable terminal of the decoder means which enables the decoder means on receipt of one of the binary symbols.

According to a fourth aspect of the present invention there is provided a method of reading signals from all set processors in apparatus according to the first aspect of the invention, having an overall gating terminal connected to the encoder means which is "set" when any data item has the said particular significance, and wherein each processor has an output shift register connected to an output terminal thereof, the method comprising the steps of shifting the output shift register of the highest priority set processor through its stages, electrically marking the highest priority set processor and thereby passing signals contained in the shift register stages successively to the processor output terminal, and reading, in synchronism, the signal at the overall gating terminal to provide a signal representative of the contents of the shift register, causing the said highest priority processor to reset its output, and repeating the preceding method steps until no more set processors remain.

BRIEF DESCRIPTION OF THE DRAWINGS

Certain embodiments of the invention will now be described, by way of example, with reference to the accompanying drawings, in which.

DESCRIPTION OF THE PREFERRED EMBODIMENTS

Figure 1:
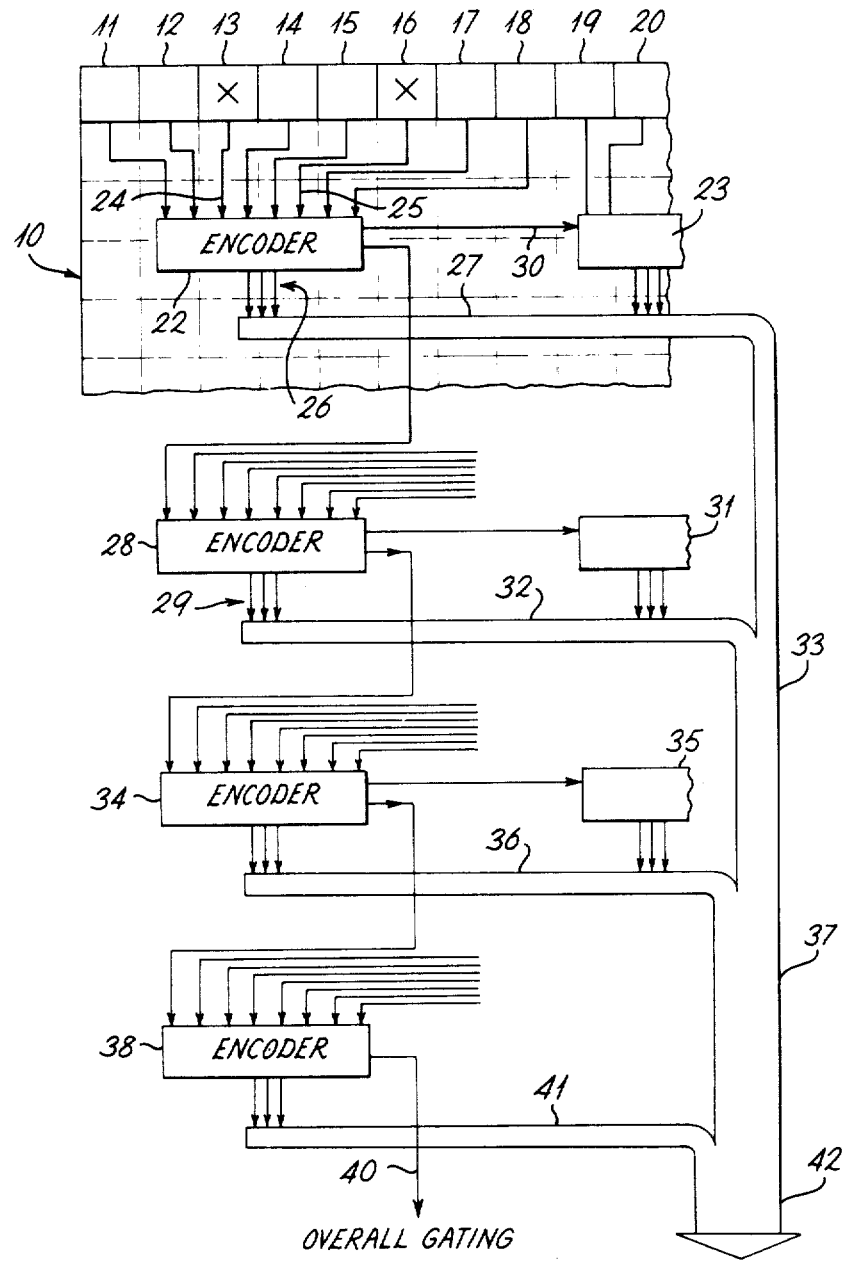
FIG. 1 is a block diagram of apparatus according to the invention.

A portion 10 of an array of 64×64 processors is shown in FIG. 1 and each processor corresponds to, and receives data from, a corresponding pixel in a 64×64 image to be processed by the array. The processors are divided into groups of eight, for example the eight processors 11 to 18 in the top left corner of the array form one group, and an output terminal from each of these processors is connected to the input terminals of a priority encoder 22. Part of the next group of processors can be seen in FIG. 1 where processors 19 and 20 are connected to a priority encoder 23. Other processors in the portion 10 of the array are indicated by means of dashed lines.

Each processor has data storage allocated thereto which may be part of the processor itself or part of a common random access memory; see for example the RAM 20 of the processor described in U.S. Pat. No. 2,129,589. The data of the image or other data arrays is transferred to processor storage for processing.

The priority encoder 22 is an integrated circuit having a number of input terminals which have a priority order and address output terminals which provide a code identifying that one of its input terminals which has the highest priority of those which are "set"; that is receive a predetermined input signal. For example if output terminals of the processors 13 and 16 were set then output terminals 26 of the encoder 22 would provide a code corresponding to the octal number 101 since the highest priority input terminal of the encoder 22 is at the left and thus the input 24 is of higher priority than the input 25. The inputs to the encoder 22 are numbered according to convention from right to left so that the input from the processor 18 corresponds to zero and the input from the processor 11 corresponds to binary 111. A suitable integrated circuit for the encoders 22 and 23 and the other encoders of the array is the Texas Instruments type SN 74 LS 348.

The encoder 22 has an "encoder selected" output which provides an enabling signal unless one or more of the encoder inputs are set and this output is connected by way of a connection 30 to an enable input of the encoder 23. Thus the encoder 23 is only able to provide an output code if the encoder 22 does not. All eight encoders receiving inputs from the processors of the top line are connected in this way and internal encoder connections pass on a set "encoder selected" output signal preventing other encoders in the group from providing address outputs. The address outputs (corresponding to the outputs 26 of the encoder 22) are connected to a three bit bus 27 so that signals on this bus represent the position of the leftmost bit which is set in the top line of the array.

The encoder 22 and the other encoders of FIG. 1 have an enable output which indicates whether any inputs to that encoder are set. These outputs of the encoders connected to the processors of the top line of the array are connected as inputs to a priority encoder 28 which therefore provides at its address output 29 a code corresponding to the leftmost encoder in the top line having a set input. Similar encoders (for example the encoder 31 which is partially shown) receive inputs from encoders connected to the other lines in the array and thus the encoders 28 and 31 form part of a group or layer of eight each of which represents a line in the array. The address output 29 from the encoder 28 and similar outputs from other encoders representing lines are connected to a bus 32 and encoder selected outputs of these encoders are connected to enable input terminals as described for the encoders of the first layer. As a result when the buses 27 and 32 are combined to provide the bus 33 a six bit binary number is provided giving the line in which the top leftmost set bit occurs and the position in that line of that bit.

The next group or layer of priority encoders which includes encoders 34 and 35 receives inputs from enable outputs of the line encoders and provides by address outputs to a bus 36 an indication of that group of eight lines in which the top leftmost set bit occurs. A further three bits is therefore added to the bus 33 to form the bus 37. Lastly (in this example) a further layer is formed by an encoder 38 which receives inputs from the encoders 34, 35 and encoders of the same group and provides outputs on a bus 41 indicating in which group of eight lines the top leftmost bit is set. Thus when the bus 41 is joined with the bus 37 a final output is obtained on a bus 42 which has four groups of bits representing the position of the top leftmost set bit in the whole array.

In addition the enable output 40 of the encoder 38 indicates whether any bit or pixel in the array is set. Output 40 is therefore the overall gating output of the array.

Figure 2:
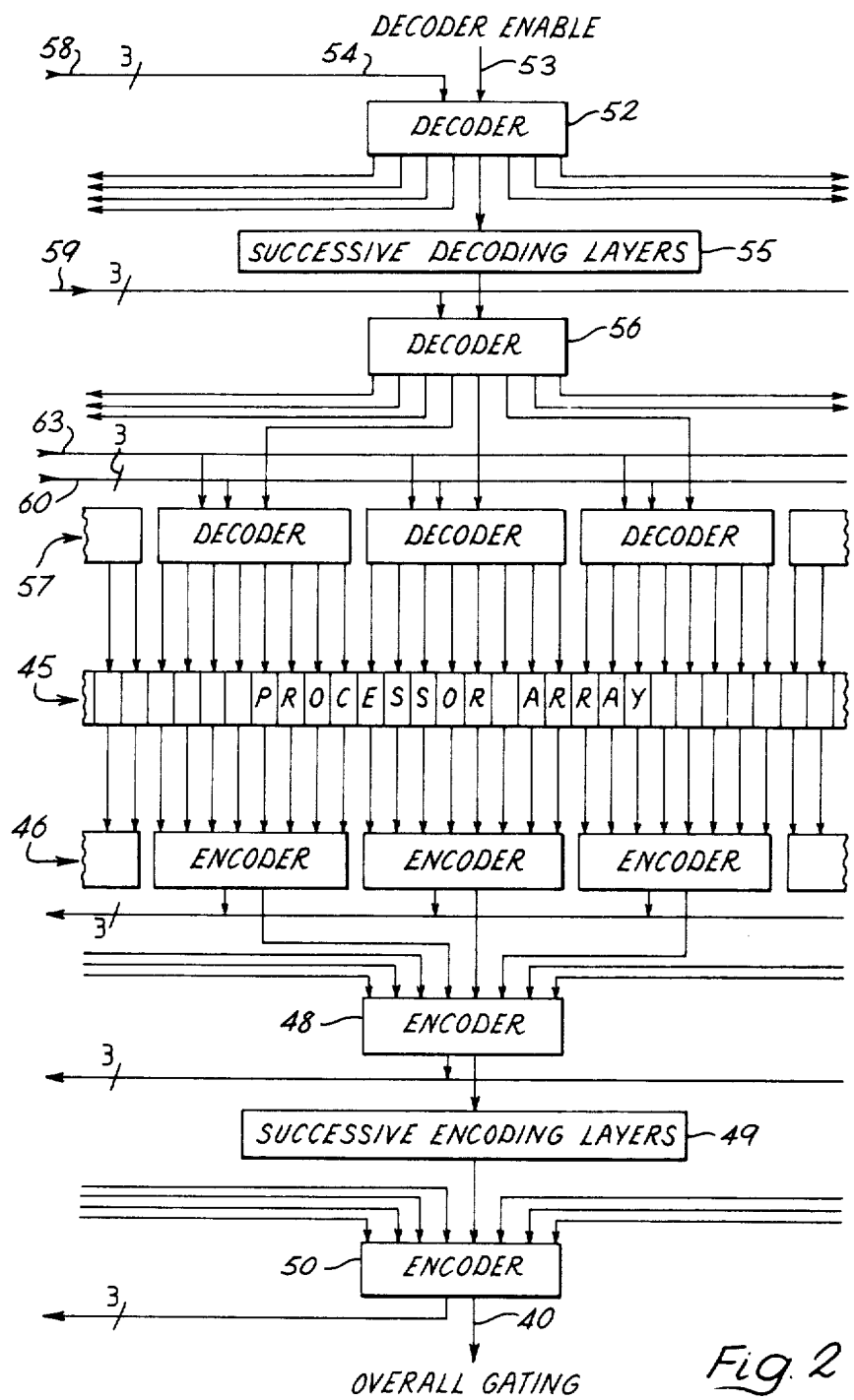
FIG. 2 is a generalised block diagram of apparatus according to the invention including decoder means.

The lower half of FIG. 2 is a generalised version of FIG. 1 where another portion 45 of the processor array is connected to a first layer of encoders 46 corresponding to the group containing the encoders 22 and 23. The enable outputs of the encoders in the layer 46 are connected as inputs to another layer of encoders represented by an encoder 48. As indicated by the box 49 many other layers of encoders may be included depending on the size of the processor array and finally a last layer represented by an encoder 50 has an overall gating output indicating whether any processor and therefore any bit or pixel in the array is set. Each layer of encoders provides three output bits of the final address of the top leftmost bit which is "set". As indicated bits 0, 1 and 2 of the address are provided by the first layer, bits 3, 4 and 5 by the second layer and bits (n−2), (n−1) and n are provided by the final layer where n+1 is a total number of bits in the address.

The number of encoders is, as indicated above, dependent on the number of processors in the array but it also depends on the size of each decoder.

In order to select a particular processor in the array and pass a signal thereto, layers of decoders (shown in FIG. 2) are used which correspond to the encoder layers of FIG. 1.

In FIG. 2 the first decoder layer is represented by a decoder 52 having an enable input 53 so that when it is required to select a particular processor the most significant three bits of the address are applied to address inputs 54 of the decoder 52 and this decoder is enabled by application of a signal to the input 53. The decoder 52 has a number of enable outputs and selects one according to its address inputs, thus enabling a single decoder in the next layer. All decoders in this next layer receive the next three most significant bits of the address. A number of intermediate decoding layers are represented by the box 55, and the last two layers are represented by a decoder 56 and a group of decoders 57, respectively.

The enable outputs of the decoders in the layer 57 are connected to respective processor input terminals which are internally serially connected to a shift register in the processor. For example in the above mentioned U.S. Pat. No. 2,129,589 an input terminal (not shown in the specification) may be connected to the S register in addition to the parallel input.

The main data and control connections of the processor array and the ways in which it is operated do not form part of the present invention and are not described here but there are many publications, for example those mentioned above, which describe such arrays. In known operation the main connections are used to cause all processors to carry out the same operation or the same group of operations simultaneously but, of course, the data used is usually different for each processor. In the processes now described the main connections are employed to control all processors to carry out some common operations.

In order to pass information to a selected processor, signals are applied to all processors by way of the main control connections to cause the internal shift registers connected to processor input terminals to shift through all stages. At the same time as the shift signals are applied, the address of a particular processor is applied to the n+1 conductors of an address bus partially shown by lines 58, 59 and 60. While a particular processor is addressed in this way a binary signal is applied to the "decoder enable" input 53 of the decoder 52 in synchronism with the shift signals. When a one is applied a one will be entered into the addressed processor's shift register while at other times a zero will be entered. Thus data carried by the binary signal will be read into the addressed processor. The input terminals of those processors which are not addressed are held at zero and the contents of their corresponding shift registers are set to zero.

Figure 3A:
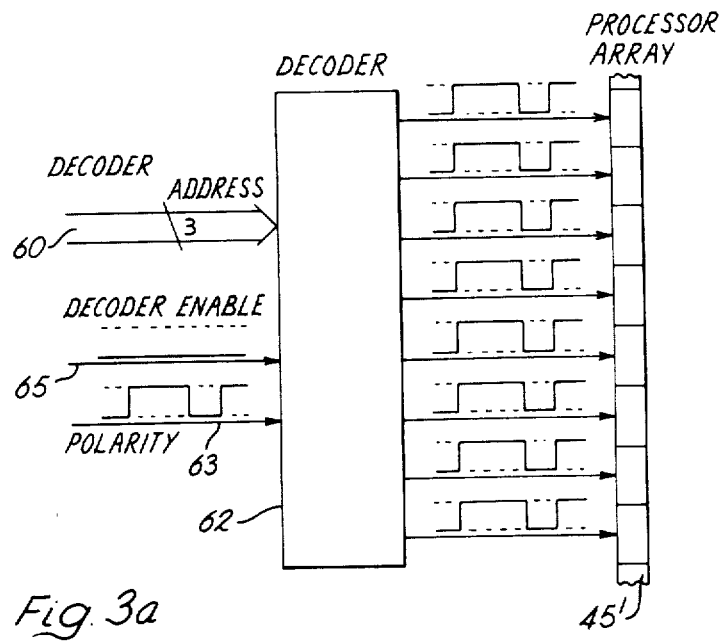
FIGS. 3a and 3b illustrate the working of a priority decoder which may be used in apparatus according to the invention.

The decoders of the layer 57 are of a type which has a "polarity" terminal and each operates to pass any binary signal to all its output terminals if the signal is applied to the polarity input. This process is illustrated in FIG. 3a where a decoder 62 in the layer 57 is illustrated together with its polarity input 63 (also shown in FIG. 2). The partial decoder address bus 60 is also shown together with a decoder enable input 65 (which is connected to an output of one of the decoders in the layer 56). A binary input waveform is shown adjacent to the input 63 and a null binary input is shown adjacent to the input 65, and the results of these inputs are shown adjacent to outputs of the decoder 62 connected to a processor array portion 45'. Thus it can be seen that if the polarity inputs of the decoders in the layer 57 are commoned, any binary input applied thereto appears at the input of each processor in the array. If the processors are also controlled to shift through their registers in synchronism with a binary signal representing an item of data, the data item is broadcast to all the processors.

Figure 3B:
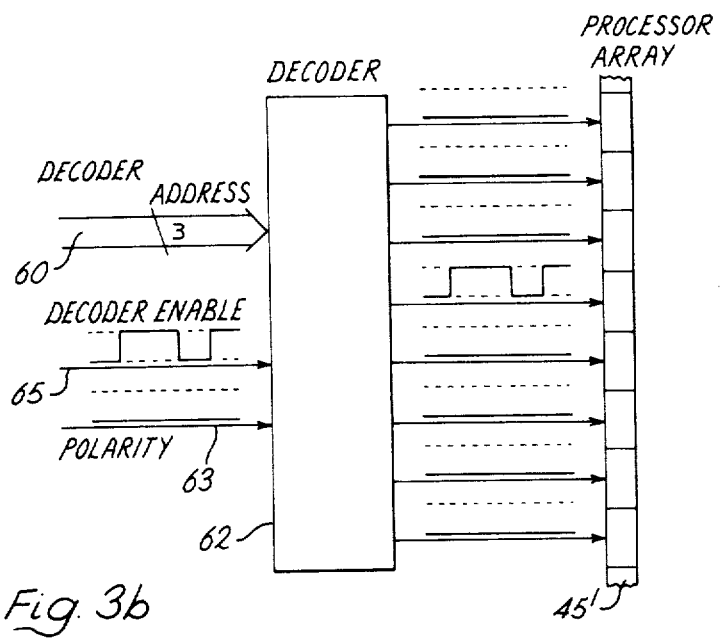

In contrast FIG. 3b shows binary signals which occur when the polarity input is kept at zero but the enable input 65 is varied according to a binary signal while an address is applied to the bus 60. Only the processor addressed receives the binary signal.

The decoder and encoder layers described also allow the contents of internal output shift registers of all set processors to be read out. The processor of U.S. Pat. No. 2,129,589 has such an output register designated $N_0$ connected to an output known as the propagation output. Suppose, for example, an operation common to all processors has been carried out in which each processor compares an image value (a number representative of intensity) for its corresponding array element with a threshold value and sets an internal flag if the threshold is exceeded while at the same time setting its output which is connected to the encoder layer 46. If additionally it is required to read out the image value of the set processors, a new data array is entered into the processor storage in which all processors receive zeros except the highest priority set processor. All processors now receive instructions to load their image values into their internal shift registers and to cycle through the shift register stages applying the contents of each stage, in turn, to the output terminal connected to the encoder layer 46. However these instructions are made conditional on holding a "one" in the new data array, so that the instruction is only carried out by the highest priority set processor, and the image value of that processor appears at the overall gating terminal 40, as follows. Each time a one appears at the output shift register stage connected to the processor output terminal a one appears on the overall gating output terminal 40 and at other times the terminal 40 is at zero. Thus if the signal at this terminal is read in synchronism with the register shift signal, the contents of the output shift register appear. The output of the highest priority set processor is now reset by instructing the processors to subtract the new array from an array formed by the flag values and to set their flags and outputs according to the result. The process of entering a new array, reading out the contents of the shift register of the new highest priority set processor and subtracting arrays is continued until contents of the registers of all set processors have been obtained.

One advantage of the encoder and decoder layers described is that the number of processors with set outputs can be counted, their locations recorded and, if required, the contents of the output shift registers of each such processor can be read. The way in which these operations are carried out is now described. First the address of the top leftmost set processor appears at the output of the bus 42 and this address is recorded, and a count is started. The contents of the shift register of this processor is then read, if required, and its set output is removed as described above using the address now available at the bus 42. The address of the second set processor then appears on this bus where it is recorded, the count incremented, the register contents read and the processor output set to zero. This process continues until all set processors have been identified when the count obtained represents the number of set processors, corresponding perhaps to the number of set pixels in an image. Such a procedure is also useful, for example, for counting the number of cells, or the number of cells of a certain type, in a biological sample when an image of the sample is formed electronically and applied to the processor array.

It will be clear that the register contents of the highest priority set processor can always be read out if required by the processes described above.

While some embodiments of the invention have been specifically described it will be apparent that the invention can be put into practice in many other ways, for example by varying the application of the invention, the size of the array and the number and size of the encoder and decoder circuits.

What is claimed is:

1. Apparatus for processing an array of items of data comprising:
   an array of processors, one processor for, and corresponding to, each item in the array of data items, each processor having an output terminal connected to an input terminal of at least one other processor in the array;
   means for applying data to the processors and reading data therefrom;
   priority encoder means, having input terminals with a priority order, for providing an output signal indicating which of said input terminals receives a signal having a predetermined value and has the highest priority; and
   means for connecting the processors to the input terminals of the priority encoder means to give each processors a priority which depends on its position in the processor array,
   wherein the encoder means comprises:
   means for producing an output signal representing the position in the processor array of the highest priority processor having an output signal of said predetermined value, and a plurality of priority encoder circuits each said priority encoder circuit having a plurality of input terminals, and a plurality of output address terminals, input signals applied to the input terminal of said priority encoder circuits being uniquely mapped to signals on the address output terminals.

2. Apparatus according to claim 1, wherein:
   each said encoder circuit has an enable terminal and includes means for providing an enable signal at the enable terminal thereof if one of the input terminal of that encoder circuit receives a predetermined signal,
   said priority encoder circuits are arranged in groups with the output terminal of each said processor connected to a respective one of said input terminals of one of said encoder circuits in a first of said groups,
   the output address terminals in each said group are connected, in parallel, and
   the enable terminals of said priority encoder circuit in each said group except a last group are connected to the input terminals of said priority encoder circuits of another of said groups.

3. Apparatus according to claim 2 wherein said last group comprises single encoder circuit, and the groups of priority encoder circuits form a progression from said first group to said last group, defined by interconnection of the enable terminals and the input terminals.

4. Apparatus for processing an array of items of data comprising:
   an array of processors, one processor for, and corresponding to, each item in the array of data items, each processor having an output terminal connected to an input terminal of at least one other processor in the array;
   means for applying data to the processors and reading data therefrom;
   priority encoder means, having input terminals with a priority order, for providing an output signal indicating which of said input terminals receives a signal having a predetermined value and has the highest priority;
   means for connecting the processors to the input terminals of the priority encoder means to give each processor a priority which depends on its position in the processor array,
   wherein said encoder means includes means for producing an output signal representing the position in the processor array of the highest priority processor having an output signal of said predetermined value; and a decoder means having address terminals, and enable terminals, each said enable terminal connected to a respective one of said processors such that an address signal applied to the address terminals selects one particular processor in the array corresponding to that address to carry out a required function.

5. Apparatus according to claim 4 wherein the decoder means comprises a plurality of decoder circuits, each said decoder circuit having a group of input terminals which, in operation, receive coded signals, and each decoder having a number of enable output terminals, and, in operation applying a predetermined signal to a selected one of said enable output terminals as determined by said coded signals.

6. Apparatus according to claim 5 wherein:
the decoder circuits are connected in groups,
the input address terminals of the circuits in each group are connected in parallel,
each group has a predetermined significance in addressing the processors,
the enable output terminals of each group except a least significant group are respectively connected to the input terminals of the decoders in the next lower significant group, and
the enable output terminals of said least significant group are respectively connected to said input terminals of the processors, there being one said enable output terminal in the decoder circuits of said least significant group for each processor.

7. Apparatus according to claim 6 wherein each processor comprises an input shift register serially coupled to one of the output enable terminals of the decoder means.

8. Apparatus for processing an array of items of data comprising:
an array of processors, one processor for, and corresponding to, each item in the array of data items, each processor having an output terminal connected to an input terminal of at least one other processor in the array;
means for applying data to the processors and reading data therefrom;
priority encoder means, having input terminals with a priority order, for providing an output signal indicating which of said input terminals receives a signal having a predetermined value and has the highest priority; and
means for connecting the processors to the input terminals of the priority encoder means to give each processor a priority which depends on its position in the processor array,
wherein said encoder means includes means for producing an output signal representing the position in the processor array of the highest priority processor having an output signal of said predetermined value,
and wherein each processor comprises an output shift register serially coupled to one of the input terminals of the encoder means.

9. Apparatus according to claim 6 further comprising overall-addressing means are provided for addressing all the processors at the same time.

10. Apparatus according to claim 9 wherein each decoder circuit in said least significant group has an additional terminal which, on the application of a predetermined signal, causes another predetermined signal to appear at all the enable output terminals of that circuit and the overall-addressing means comprises a connection to each said additional terminal.

* * * * *